Dec. 19, 1967   P. J. CHRISTOPHER   3,358,748
STEAM TURBINE COOLING SYSTEM
Filed Aug. 19, 1965   2 Sheets-Sheet 1

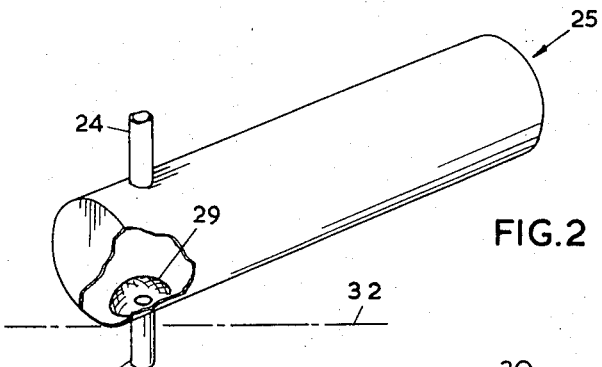
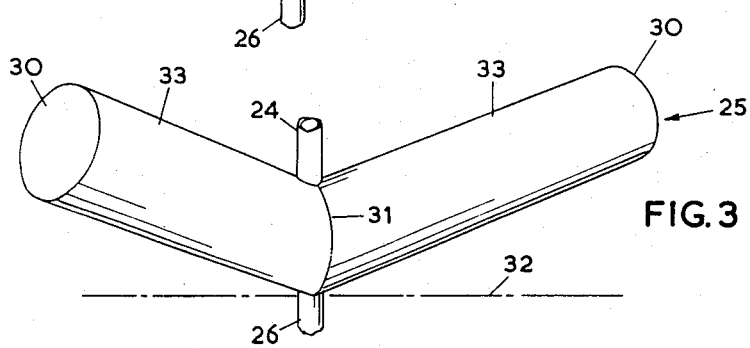
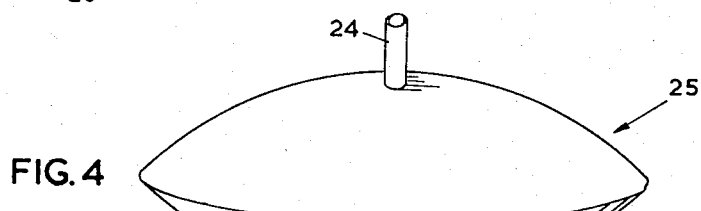
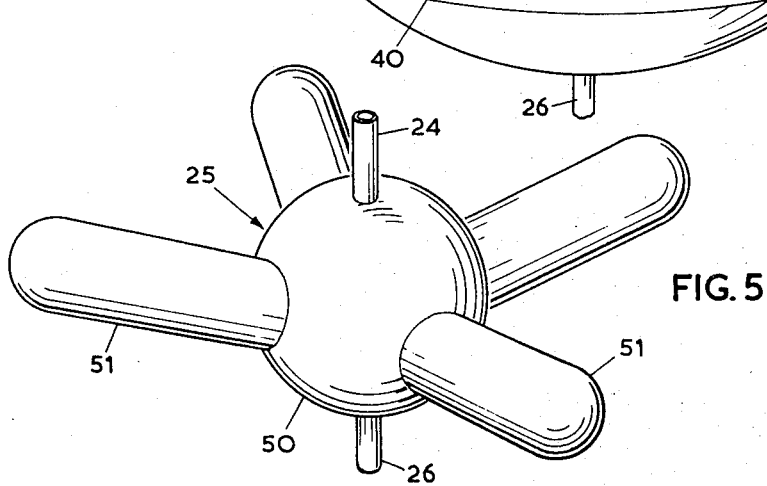

United States Patent Office 3,358,748
Patented Dec. 19, 1967

3,358,748
STEAM TURBINE COOLING SYSTEM
Peter James Christopher, Rugby, England, assignor to The English Electric Company Limited, London, England, a British company
Filed Aug. 19, 1965, Ser. No. 480,948
Claims priority, application Great Britain, Sept. 4, 1964, 36,279/64
1 Claim. (Cl. 165—46)

ABSTRACT OF THE DISCLOSURE

Steam turbine cooling systems of the kind including a direct contact condenser, the condensate from which is fed to a cooler for cooling by indirect heat exchange with air circulated over the cooler by a dry cooling tower, a water tank being connected into the system for storing water emptied from the system and for filling the system as required. It is advantageous to insure that the water in the system is of minimum oxygen content and this is achieved by providing a water tank of flexible waterproof material which is closed from the atmosphere and which collapses to the volume of the water contained in the tank by the action of atmospheric pressure on the outside of the tank.

---

Figure 1:
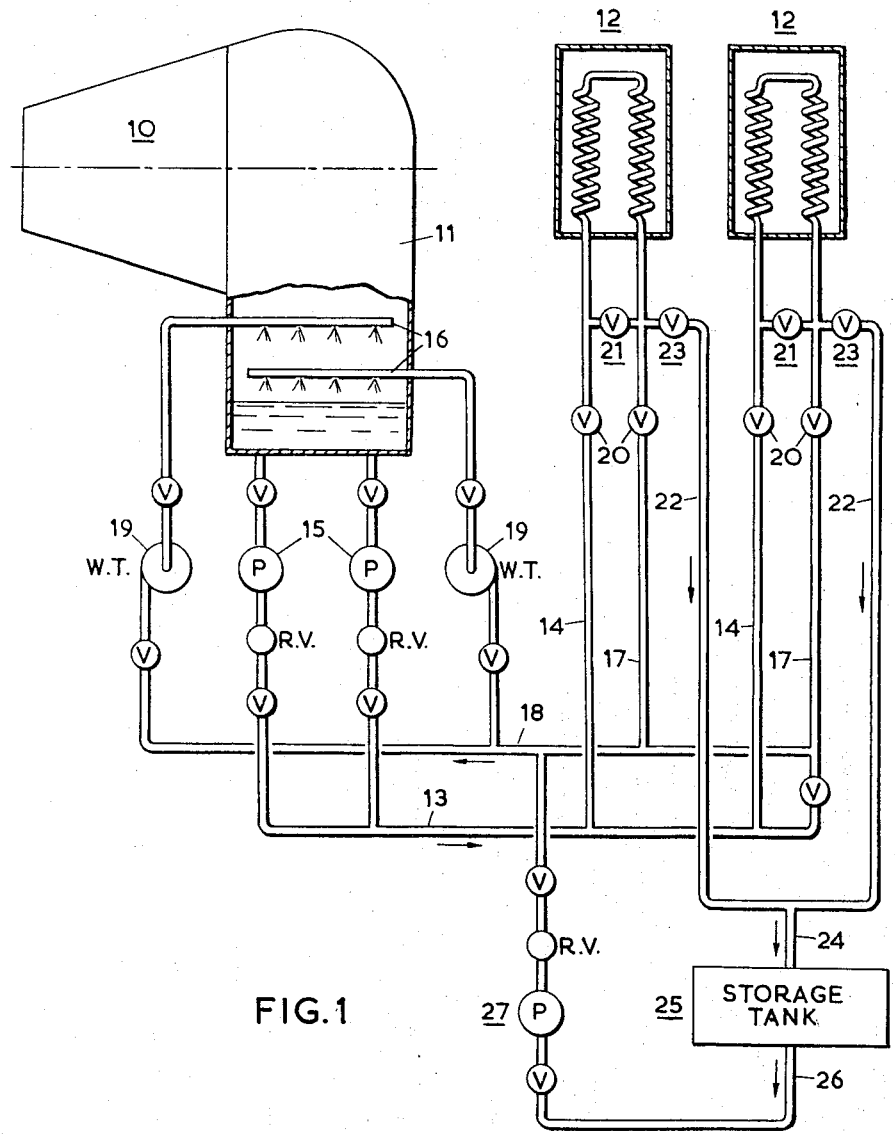

The invention relates to a steam turbine cooling system. In steam turbine cooling systems of the kind with which the present invention is concerned, the water storage tank is commonly of sheet metal and in order to empty water from the system into this tank, it is necessary to vent the air in the tank to atmosphere. Similarly, when it is required to feed water from the tank into the system, it is necessary to displace this water by air drawn in from the atmosphere.

The object of the present invention is to provide a system in which the oxygen content of the water in the system is kept to a minimum whereby to maintain the best vacuum in the mixing condenser and to minimize corrosion of the system.

Thus the improvement of the present invention comprises providing a water tank of flexible waterproof material which isolates water contained therein from the atmosphere and which collapses, by the action of the atmospheric pressure on the outside of the tank, to the volume of the water contained in the tank.

A steam turbine cooling system constructed in accordance with the invention will now be described by way of example and with reference to the accompanying drawings, of which:

FIG. 1 is a simplified diagram showing the principal components of the cooling system; and FIGURES 2, 3, 4 and 5 are perspective views showing three different forms of water storage tank according to the invention for use in a storage system such as that shown in FIG. 1.

With reference firstly to FIG. 1, a cooling system for exhaust steam from a steam turbine 10, condensed in a direct-contact steam condenser 11, includes a number of water coolers 12 (two of which are shown) associated with a dry cooling tower (not shown) for cooling water condensate from the condenser 11 by indirect heat exchange with air.

Hot condensate is supplied to the coolers 12 through a distributing main 13 and inlet branch pipes 14 by pumps 15, valves V and non-return valves RV being suitably disposed in said distributing main, and is returned (after being cooled in the coolers 12) to water jets 16 of the condenser 11 through outlet branch pipes 17, a return main 18 and water turbines 19, the latter being provided to extract residual energy from the water.

Valves 20 are provided in the inlet and outlet branch pipes 14, 17, and between the valves 20 associated with each cooler 12 and the coolers themselves the pipes 14 and 17 are connected together through a valve 21. Each outlet branch pipe 17 is also connected to a drain pipe 22 in which there is a drain valve 23. The drain pipes 22 from all the coolers 12 are connected to the water inlet 24 of a water storage system comprising a closed storage tank indicated diagrammatically at 25. The tank 25 has a water outlet 26 connected through valves V, a non-return valve RV, and a pump 27 to the return main 18. Water drawn by the pump 27 from the tank 25 may be used for filling empty coolers 12 or for making up the water in the system generally, as required, said drawn water being fed to the condenser 11 by way of the return main 18 and the water turbine 19.

The water outlet 26 from the storage tank is situated lower than the remainder of the cooling system, and to achieve this easily the storage tank 25 lies in a suitable depression in the ground or on a suitable supporting structure (not shown).

The storage tank 25 is closed so as to prevent water coming into contact with the atmosphere outside the tank.

With reference now to FIGS. 2 to 5, the storage tank 25 comprises a closed collapsible vessel made of a flexible waterproof material of sufficient strength. Two examples of suitable materials are reinforced rubber and, suitably reinforced, a synthetic rubber such as that sold under the name "neoprene." In the form shown in FIG. 2, the vessel is cylindrical with the inlet 24 and outlet 26 near one end, this end being anchored to the ground or to the supporting structure.

In the form shown in FIG. 3, the vessel is in the form of two cylindrical arms 33 joined end to end, and closed at their other ends 30, the inlet 24 and outlet 26 being arranged at the junction 31 between the arms 33 and the arms being inclined upwardly from the junction 31.

In the form shown in FIG. 4 the vessel is in the form of two part-spheres inverted relatively to each other and joined at the perimeter 40, the plane of which is parallel with the ground, the inlet 24 being at the topmost point of the vessel and the outlet 26 at its lowest point.

In the form shown in FIG. 5, the vessel comprises a spherical central portion 50 from which there radiates a number of cylindrical arms 51 inclined upwardly from the central portion 50. The inlet 24 and outlet 26 are at the poles of the portion 50.

In each case a metal filter screen is preferably arranged over the outlet 26 inside the vessel to prevent foreign matter entering the outlet. The vessel in FIG. 2 is shown partly cut away to reveal such a screen at 29.

In normal operation of the cooling system the valves 21 and 23 are closed and no water passes to the tank 25, which may therefore be empty. The action of atmospheric pressure on the outside of the tank 25 causes it to tend to collapse so that its volume is always only that of the water inside the tank. Thus when empty the tank will be completely collapsed.

In order that the outlets 26 of the tanks shown in FIGS. 2 and 3 shall each always be at the lowest point of the tank (the level of which is indicated by a chain-dotted line at 32), the vessels are shaped so that when full their outer ends 30, that is the end or ends remote from the outlet 26, are at a higher level than the outlet 26, suitable supporting means (not shown) for each outer end 30 being provided if necessary.

Additional embodiments of the invention in this specification will occur to others and therefore it is intended that the scope of the invention be limited only by the appended claim and not by the embodiment described hereinabove. Accordingly, reference should be made to the following claim in determining the full scope of the invention.

What I claim as my invention and desire to secure by Letters Patent is:

A steam turbine cooling system of the kind comprising a direct contact condenser having a condensate drain outlet and a cooling water inlet, at least one cooler having an inlet and an outlet, first and second pipes connecting said condensate drain outlet and said cooler inlet and said condensate cooling water inlet and said cooler outlet, respectively, whereby condensate may be fed into said cooler for cooling by indirect heat exchange with air circulated over said cooler and returned to said condenser, and a water tank connected into the system for storing water emptied from the system and for filling up the system when required, wherein the improvement comprises providing said water tank of flexible waterproof material which isolates water contained therein from the atmosphere and which collapses, by the action of the atmospheric pressure on the outside of the tank, to reduce the size of the tank to the volume of the water contained in the tank.

References Cited

UNITED STATES PATENTS

| | | | |
|---|---|---|---|
| 2,389,898 | 11/1945 | De Cota | 60—95 X |
| 2,724,418 | 11/1955 | Krupp | 150—.5 |
| 3,016,938 | 1/1962 | Akreb | 150—.5 |
| 3,194,021 | 1/1965 | Peake et al. | 60—95 |
| 3,282,361 | 11/1966 | Mackie | 150—.5 |

ROBERT A. O'LEARY, *Primary Examiner.*

T. W. STREULE, *Assistant Examiner.*